Patented Oct. 18, 1932

1,883,614

UNITED STATES PATENT OFFICE

CLYDE C. DE WITT, OF HOUGHTON, MICHIGAN

METHOD OF COATING PARTICLES

No Drawing.　　　Application filed June 27, 1929. Serial No. 374,283.

This invention relates to a method of producing a coating of hydrated iron oxide on the surface of sand, clay, or other suitable particles, the principal object being the provision of a cheap and efficient method of providing such coating.

Another object is to provide a method of producing a film of hydrated iron oxide on the surfaces of sand, clay, or other particles by the use of ferrous carbonate or spathic iron ore in a finely divided state, carbon dioxide, and air or other oxygen containing gases.

A further object is to provide a method of producing a film of hydrated iron oxide on the surfaces of sand or clay particles including the employment of spathic iron ore and stack gases.

Although particles other than sand or clay may obviously be treated in the same manner as the sand and clay herein described, I have described the present method in connection with sand and/or clay particles for the reason that a wide field of use is at the present time open to such coated particles.

In accordance with the present invention, the sand and clay particles are mixed, mechanically or otherwise, with a suitable portion of finely divided ferrous carbonate or spathic iron ore. This mixture is then moistened, preferably evenly throughout, and is then exposed to the action of gases containing carbon dioxide. Although such gases may be obtained in any one of a variety of suitable manners, I prefer, for the sake of economy, to employ stack gases, which, of course, contain a material amount of carbon dioxide. The sand and clay particles thus mixed with the ferrous carbonate may be treated in any suitable manner in order to bring the carbon dioxide containing gases into intimate contact therewith.

The manner in which this is accomplished may of course vary. It may be forced or sucked through the mixture, or the mixture may be agitated or milled in the presence of such gas. Inasmuch as the carbon dioxide is soluble in water, I find it preferable to form the mixture into a slimy consistency and pass the gas through it. Furthermore, in a view of the fact that carbon dioxide is best absorbed in cold water, it is preferable, when employing stack gases, to cool such gases before they are passed through the mixture and where it is desired to increase the absorption of the carbon dioxide, to carry out the absorption step under pressure. I find that in so cooling the stack gases the colloidal iron oxide forms a better coating on the particles being treated. Sufficient carbon dioxide containing gases are passed through the material thus being treated until substantially all the ferrous carbonate or spathic iron ore is converted into ferrous bicarbonate. The principal reaction is as follows:

$$FeCO_3 \text{ plus } H_2CO_3 = Fe(HCO_3)_2$$

I then discontinue the passing of carbon dioxide through the mixture and then pass air or other oxygen containing gases through the mixture at atmospheric or higher pressures. This oxygen containing gas does not need to be pure and the presence of carbon dioxide in it is immaterial. This causes the ferrous bicarbonate to be converted into ferric hydrosol and finally into hydrated iron oxide. This reaction is as follows:

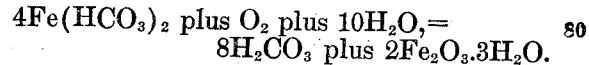

$$4Fe(HCO_3)_2 \text{ plus } O_2 \text{ plus } 10H_2O, = \\ 8H_2CO_3 \text{ plus } 2Fe_2O_3.3H_2O.$$

By the term "hydrated iron oxide" I mean a gel of iron oxide and water; i. e. colloidal ferric hydroxide which may contain more or less water associated with the iron oxide than the chemical formula $Fe_2O_3.3H_2O$ indicates. It will be understood that this meaning attaches to this term throughout the following specification and claims.

The ferrous carbonate being in true solution at least for a part of the time during the latter step is brought into intimate contact with the particles of sand and clay or other materials which it is desired to coat with a film of hydrated iron oxide. The wetting of the sand or clay particles is, of course, easily accomplished in the practice of the present invention due to the fact that in absorbing the carbon dioxide the surface tension of the water is materially lowered which permits it to spread more easily over the surfaces of the particles. This is particularly valuable in view of the fact that it is difficult to make pure water wet the surfaces of such particles unless such surfaces are clean, while in the case of the present invention the relative cleanliness of the surfaces is of little or no practical importance. Mechanical mixing may be resorted to if desired.

The particles of material thus treated may, if desired, or required, after completion of the process be washed or screened to separate it from any other particles that may be present in the mixture. The particles thus coated may of course be employed for any purpose desired.

The above method may be varied in detail without particularly affecting the method involved. For instance, an alternate method that may be found satisfactory is to pass stack gases or other carbon dioxide containing gases through a mixture of iron, ferrous carbonate and water to make an iron bicarbonate solution. The sand or other particles to be coated may then be wetted or dampened with this solution and exposed to the action of air or other oxygen containing gases, which will result in the conversion of the iron bicarbonate in the solution wetting the particles into a film of colloidal iron oxide in accordance with the reaction as heretofore given.

Still another method would be to dissolve the ferrous carbonate in a water solution of carbon dioxide which had been super-saturated with carbon dioxide in the cold state and under pressure and then employ this solution for coating the sand or other particles, after which such coated particles are exposed to the action of air or other oxygen gases to convert the ferrous bicarbonate into the hydrated iron oxide. This method of coating particles with other hydrated oxides of metals whose bicarbonates are soluble in water may be employed generally for those metals which have bicarbonates capable of being oxidized to oxides in which the metal has a higher valence than in the bicarbonate.

It will be evident, of course, that in using a stack gas there is a possibility that sufficient oxygen may be present to complete the two operations as a single step in the process. The same is true where carbon dioxide from another source is employed and sufficient oxygen is either present or is added to accomplish the two reactions in one step. In any case the solution of the insoluble ferrous carbonate as soluble ferrous bicarbonate occurs in advance of its oxidization, even though both gases are simultaneously present, and in the following claims where two distinct steps are apparent it will be understood that these steps are chemical rather than mechanical, although they may be separate mechanically as well.

Formal changes may be made in the specific embodiment of the invention described without departing from the spirit and substance of the broad invention, the scope of which is commensurate with the appended claims.

What I claim is:

1. The method of coating particles of material with hydrated iron oxide comprising in first subjecting said particles to the action of a water mixture of ferrous carbonate and carbon dioxide, and then subjecting said particles to the action of oxygen.

2. The method of coating particles of material with hydrated iron oxide, comprising in first treating said particles with a mixture of ferrous carbonate, water and carbon dioxide, and then treating said particles with an oxygen containing gas.

3. The method of coating particles of material with hydrated iron oxide, comprising in mixing said particles with finely divided ferrous carbonate, wetting said mixture, then subjecting said mixture to the action of carbon dioxide, and then subjecting said mixture to the action of oxygen.

4. The method of coating particles of material with hydrated iron oxide, comprising in mixing spathic iron ore with said particles, moistening said mixture, subjecting said moistened mixture to the action of a carbon dioxide containing gas, and then subjecting said moistened mixture to the action of an oxygen containing gas.

5. The method of coating particles of material with hydrated iron oxide, comprising in mixing said particles with ferrous carbonate and water to form a slime, passing carbon dioxide through said slime, and then subjecting said mixture to the action of oxygen.

6. The method of coating particles of material with hydrated iron oxide, comprising in mixing said particles with finely divided ferrous carbonate and water, bringing said mixture into intimate contact with a stack gas, and then subjecting said mixture to an oxygen treatment.

7. The method of coating particles of material with hydrated iron oxide, comprising in first treating said particles with a mixture of ferrous carbonate, water and stack gases, and then treating said particles with an oxygen containing gas.

8. The method of coating particles of material with hydrated iron oxide, comprising in mixing said particles with finely divided spathic iron ore and water, bringing stack gases into intimate contact with said mixture, and then subjecting said mixture to an oxygen treatment.

9. The method of coating particles of material with hydrated iron oxide, comprising in mixing said particles with finely divided spathic iron ore and water, bringing stack gases into intimate contact with said mixture, and then passing air through said mixture.

10. The method of coating particles of material with hydrated iron oxide comprising in first subjecting said particles to the action of a water mixture of ferrous carbonate and carbon dioxide under pressure, and then subjecting said particles to the action of oxygen.

11. The method of coating particles of material with hydrated iron oxide comprising in first subjecting said particles to the action of a water mixture of ferrous carbonate and carbon dioxide, and then subjecting said particles to the action of oxygen under pressure.

CLYDE C. DE WITT.